(12) United States Patent
Lee (10) Patent No.: US 11,092,832 B2
(45) Date of Patent: Aug. 17, 2021

(54) FRAME FOR VEHICLE, VEHICLE, AND METHOD FOR INSTALLING GLASS PLATE CONTAINING VARIABLE TRANSPARENCY REGION ON FRAME OF VEHICLE

(71) Applicants: HYUNDAI MOTOR COMPANY, Seoul (KR); KIA MOTORS CORPORATION, Seoul (KR)

(72) Inventor: Sung Woo Lee, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 197 days.

(21) Appl. No.: 16/458,398

(22) Filed: Jul. 1, 2019

(65) Prior Publication Data

US 2020/0117040 A1 Apr. 16, 2020

(30) Foreign Application Priority Data

Oct. 16, 2018 (KR) .................. 10-2018-0123349

(51) Int. Cl.
| | | |
|---|---|---|
| G02F 1/1333 | (2006.01) | |
| G02F 1/1345 | (2006.01) | |
| B60J 1/00 | (2006.01) | |
| B60J 3/04 | (2006.01) | |

(52) U.S. Cl.
CPC ........ *G02F 1/133308* (2013.01); *B60J 1/007* (2013.01); *B60J 3/04* (2013.01); *G02F 1/1345* (2013.01); *G02F 1/133365* (2013.01); *G02F 1/133325* (2021.01)

(58) Field of Classification Search
CPC ......... G02F 1/133308; G02F 1/133365; G02F 1/1345; G02F 1/133325; B60J 1/007; B60J 3/04
See application file for complete search history.

(56) References Cited

U.S. PATENT DOCUMENTS 6,039,390 A * 3/2000 Agrawal ........... B32B 17/10036
296/211

* cited by examiner

*Primary Examiner* — D Glenn Dayoan
*Assistant Examiner* — Melissa Ann Bonifazi
(74) *Attorney, Agent, or Firm* — McDonnell Boehnen Hulbert & Berghoff LLP (57) ABSTRACT

A frame for a vehicle is provided such that a glass plate including a variable transparency region is installed. The frame includes a glass plate mount that is stepped to allow the glass plate to be inserted and mounted. A cable passage is defined in one side surface of the glass plate mount to allow a cable connected to a connection portion of the glass plate to pass through the cable passage.

9 Claims, 7 Drawing Sheets

FRAME FOR VEHICLE, VEHICLE, AND METHOD FOR INSTALLING GLASS PLATE CONTAINING VARIABLE TRANSPARENCY REGION ON FRAME OF VEHICLE

CROSS REFERENCE TO RELATED APPLICATION

This application is based on and claims the benefit of priority to Korean Patent Application No. 10-2018-0123349, filed on Oct. 16, 2018, in the Korean Intellectual Property Office, the disclosure of which is incorporated herein in its entirety by reference.

TECHNICAL FIELD

The present disclosure relates to a frame for a vehicle, a vehicle, and a method for installing a glass plate containing a variable transparency region on the frame of the vehicle

BACKGROUND

In recent years, vehicles including a variable transparency switching window (VTSW) applied to front glasses or sunroofs thereof increase. The transmittance of the variable transparency switching window (VTSW) may be varied based on each transparency. Accordingly, an apparatus for controlling the transmittance has been developed to provide a transparency based on a user selection. In addition, a transparency of the windshield is controlled to implement an imagery-type head-up display (HUD) on a windshield of the vehicle, and in this case, the transparency of the variable transparency switching window (VTSW) is controlled by a controller of an HUD system or a controller of the vehicle even though there is no user control input.

In general, the variable transparency switching window (VTSW) includes a transmission layer that is capable of changing light transmission and optical characteristics in response to power applied to power supply electrode terminals via two power supply electrodes. When the transmission layer is configured as described above, the variable transparency switching window (VTSW) includes a transmission layer made of a liquid crystal polymer in general.

Accordingly, a fastening structure between the variable transparency switching window (VTSW) and the frame, in which a cable for electrically connecting the controller and the transmission layer is installed, is required to supply and control the power to the transmission layer.

In particular, since the window of the vehicle is continuously exposed to vibration or external pollution during operation of the vehicle, an assembling structure that has a high coupling force between the window and the frame while stably maintaining the electrical connection between the variable transparency switching window (VTSW) and the cable is required. However, conventionally, the fastening structure between the window and the frame suitable for the assembling structure has not been proposed.

SUMMARY

The present disclosure has been made to solve the above-mentioned problems occurring in the prior art while advantages achieved by the prior art are maintained intact.

An aspect of the present disclosure provides a frame for a vehicle, which is provided to allow a glass plate containing a variable transparency region to be installed.

An aspect of the present disclosure provides a structure capable of optimally assembling a glass plate containing a region where a transparency is variable and the frame.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a frame for a vehicle, at which a glass plate including a variable transparency region is installed, is provided.

The frame includes a glass plate mount that is stepped to allow the glass plate to be inserted and mounted.

The glass plate mount is provided with a cable passage defined in one side surface thereof to allow a cable connected to a connection portion of the glass plate to pass through the cable passage.

According to an aspect of the present disclosure, a vehicle includes a laminated glass including first and second transparent plates stacked one on another in a predetermined stacking direction and a variable transmission layer disposed between the first and second transparent plates and having a transmittance that is variable in response to an electrical signal applied thereto, a frame including a glass plate mount that is stepped to allow the laminated glass to be inserted and mounted, and a controller adjusting a transparency of the variable transmission layer.

A connection portion is disposed on a portion of the first transparent plate, which extends more in a direction perpendicular to the stacking direction than the second transparent plate, to be connected to the variable transmission layer.

A cable passage hole is defined in the glass plate mount at a position corresponding to the connection portion.

A cable is connected to the connection portion after passing through the cable passage hole to electrically connect the controller to the variable transmission layer.

According to another aspect of the present disclosure, a method for installing a glass plate including a variable transparency region on a frame for a vehicle includes installing the glass plate on a glass plate mount of the frame and allowing a cable to pass through a cable passage formed in the glass plate mount such that the cable is connected to a connection portion of the glass plate, injecting a sealant into a space between the glass plate and the frame through the cable passage, and uniformly distributing the sealant on a coupling surface between the glass plate and the frame using a vacuum pump.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
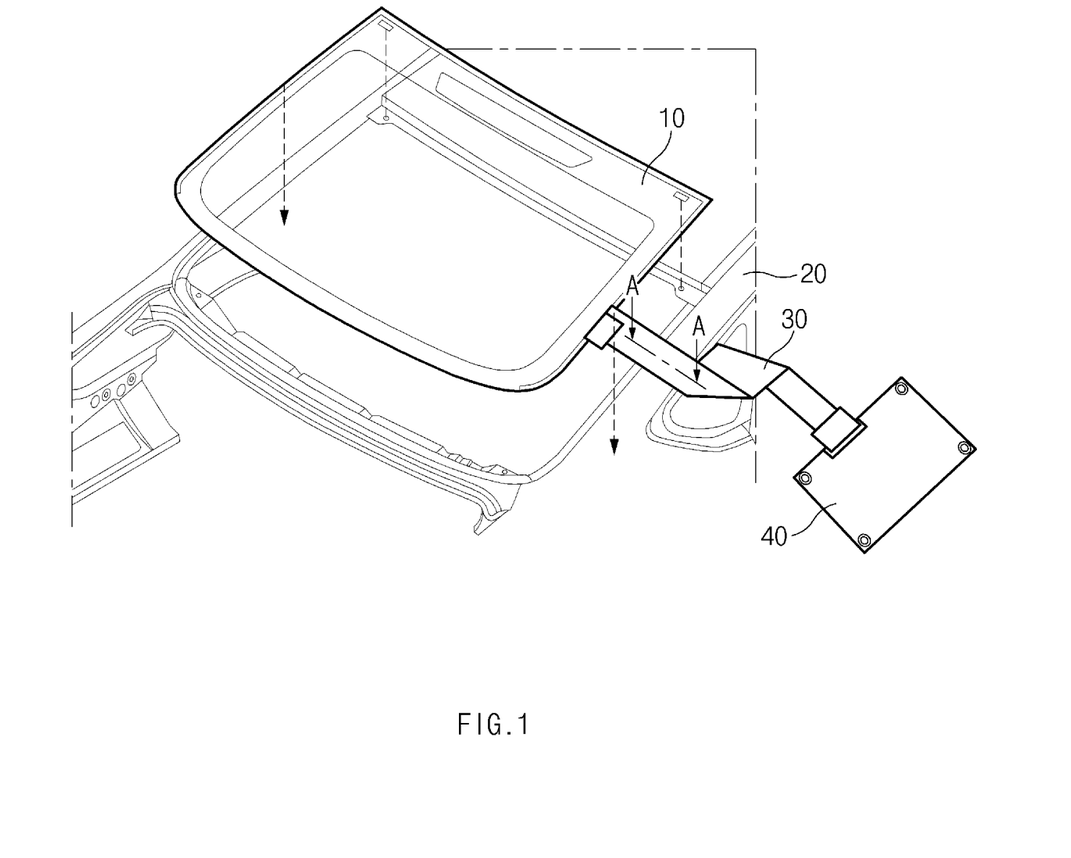
FIG. 1 is a perspective view showing a windshield of a vehicle, which is mounted on a frame for the vehicle according to an exemplary embodiment of the present disclosure.
Figure 2:
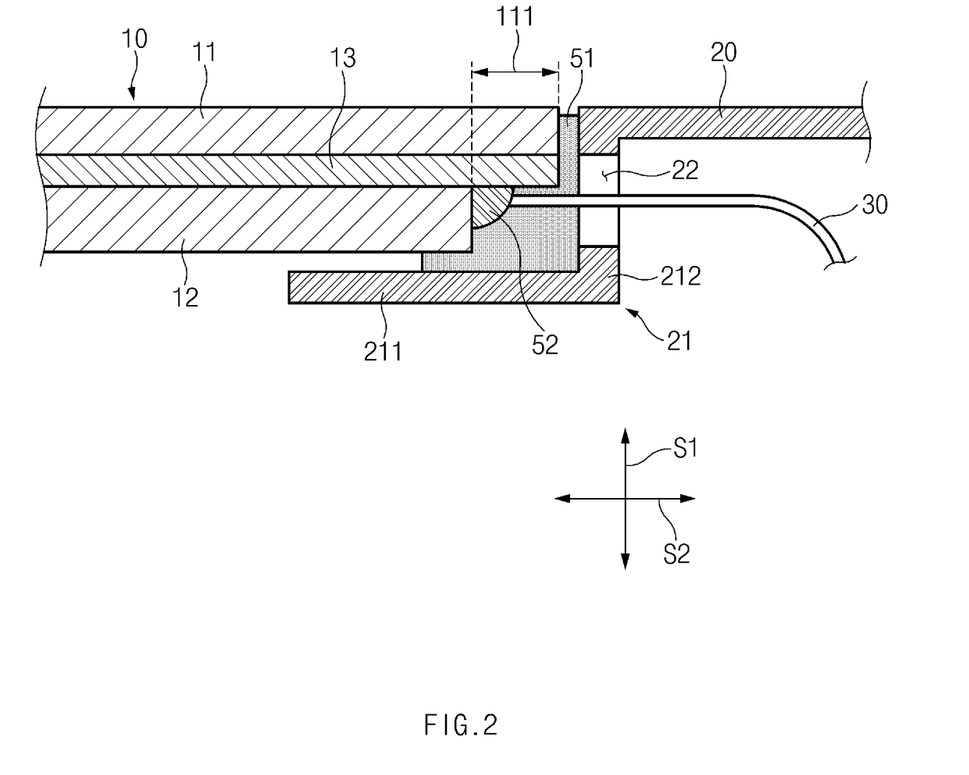
FIG. 2 is a view showing a cross-section taken along a line A-A' of FIG. 1.

FIG. 1 is a perspective view showing a windshield 10 of a vehicle, which is mounted on a frame 20 for the vehicle according to an exemplary embodiment of the present disclosure, and FIG. 2 is a view showing a cross-section taken along a line A-A' of FIG. 1.

The frame 20 according to the present exemplary embodiment is prepared such that a glass plate containing a variable transparency region may be installed. The frame 20 includes a glass plate mount that is stepped to allow the glass plate to be inserted and mounted.

In the present exemplary embodiment, the windshield 10 will be described as a representative example of the glass plate, however, the present disclosure should not be limited thereto or thereby. That is, the glass plate may be applied to various glass plates provided in the vehicle, such as a rear glass plate, an upper glass plate, and a sunroof of the vehicle.

A cable passage through which a cable 30 connected to a connection portion 17 of the windshield 10 passes is defined in one side surface of a windshield mount 21 of the frame 20.

In the present exemplary embodiment, the cable passage is defined as a cable passage hole 22 having a hole shape.

Meanwhile, although not shown in figures, the cable passage may be defined as a recess shape by recessing or cutting-away a portion of the frame 20.

The cable 30 may electrically connect a controller 40 of the vehicle to the windshield 10. The cable 30 may have a thin flat end connected to the connection portion 17 of the windshield 10.

In recent years, vehicles including a variable transparency switching window (VTSW) applied to front glasses or sunroofs thereof increase. The transmittance of the variable transparency switching window (VTSW) may be varied based on each transparency. Accordingly, an apparatus for controlling the transmittance has been developed to provide a transparency based on a user selection. In addition, a transparency of the windshield is controlled to implement an imagery-type head-up display (HUD) on the windshield of the vehicle, and in this case, the transparency of the variable transparency switching window (VTSW) may be controlled by a controller of an HUD system or a controller of the vehicle even though there is no user control input.

In general, the variable transparency switching window (VTSW) includes a transmission layer that is capable of changing light transmission and optical characteristics in response to power applied to power supply electrode terminals via two power supply electrodes. When the transmission layer is configured as described above, the variable transparency switching window (VTSW) includes a transmission layer made of a liquid crystal polymer in general.

Accordingly, a fastening structure between the variable transparency switching window (VTSW) and the frame, in which a cable for electrically connecting the controller and the transmission layer is installed, is required to supply and control the power to the transmission layer.

In particular, since the window of the vehicle is continuously exposed to vibration or external pollution during operation of the vehicle, an assembling structure that has a high coupling force between the window and the frame while stably maintaining the electrical connection between the variable transparency switching window (VTSW) and the cable is required. However, conventionally, the fastening structure between the window and the frame suitable for the assembling structure has not been proposed.

The present disclosure relates to the frame for the vehicle, which is provided to allow the glass plate containing the variable transparency region to be installed. In more detail, the frame for the vehicle according to the present exemplary embodiment includes the glass plate mount, which is stepped to allow the glass plate containing the variable transparency region to be mounted and to be stably connected to the cable transmitting a power and a control signal, and includes the cable passage defined in the one side surface of the glass plate mount to allow the cable connected to the connection portion of the glass plate to pass.

The characteristics of the frame for the vehicle according to the present exemplary embodiment will be described in detail below.

Referring to FIG. 2, the windshield 10 may include an outer transparent plate 11 and an inner transparent plate 12, which are stacked one on another in a predetermined stacking direction S1. The windshield 10 may include a variable transmission layer 13 disposed between the outer transparent plate 11 and the inner transparent plate 12 and having a transmittance that is variable in response to an electrical signal applied thereto.

The outer transparent plate 11 may include an extension portion 111 that further extends in a direction S2 perpendicular to the stacking direction S1.

The connection portion (17 in FIG. 3) of the variable transmission layer 13 may be disposed on the extension portion 111 of the outer transparent plate 11. That is, the outer transparent plate 11 extends more in the direction S2 perpendicular to the stacking direction S1 than the inner transparent plate 12, and thus a space in which the connection portion 17 is located may be defined. Accordingly, the connection portion 17 may be located inside an outer edge of the outer transparent plate 11 with respect to the direction S2 perpendicular to the stacking direction S1. In addition, the connection portion 17 may be located outside an outer edge of the inner transparent plate 12 with respect to the direction S2 perpendicular to the stacking direction S1.

Through the above, the connection portion 17 may not be interfered by the inner transparent plate 12. In addition, the connection portion 17 may be protected from external impacts or pollutions by the outer transparent plate 11. Further, processes for connecting the connection portion 17 and the cable 30 and fixing the connection portion 17 and the cable 30 using an inner sealant 52 may be easily performed.

The frame 20 may include the windshield mount 21 that is stepped to allow the windshield 10 to be inserted and mounted.

The windshield mount 21 may have a shape in which a portion of the frame 20 is recessed by a predetermined depth into the inside of the frame 20.

The windshield mount 21 may include a lower surface portion 211 and a side surface portion 212.

The windshield 10 may be mounted on the lower surface portion 211, and the lower surface portion 211 may support the windshield 10 on one side of the stacking direction S1. The lower surface portion 211 may extend in the direction S2 perpendicular to the stacking direction S1 by a predetermined length. As the lower surface portion 211 extends further in the direction S2 perpendicular to the stacking direction S1, a coupling force between the lower surface portion 211 and the windshield 10 may increase. In this case, however, since more area of the windshield 10 is covered by the frame 20, the windshield mount 21 may be formed in a suitable shape in consideration of the above.

The side surface portion 212 may connect the lower surface portion 211 and a remaining portion of the frame 20. The side surface portion 212 may extend in the stacking direction S1 by a predetermined length. The side surface portion 212 may be disposed to surround the windshield 10 and may provide a space on which the windshield 10 is mounted.

The cable passage hole 22 may be formed through one side surface of the windshield mount 21 such that the cable 30 passes through the cable passage hole 22.

The cable passage hole 22 may be formed at a location corresponding to the connection portion 17 when the windshield 10 is coupled to the frame 20. The cable passage hole 22 may be formed in the one side surface of the windshield mount 21 to correspond to the location of the connection portion 17 with respect to the stacking direction S1 and may allow the cable 30 to be suitably connected to the connection portion 17 after passing through the cable passage hole 22.

In an embodiment, the cable passage hole 22 may be formed in the side surface portion 212 of the windshield mount 21. That is, the cable passage hole 22 may be formed in the windshield mount 21 along a direction perpendicular to an insertion direction into which the windshield 10 is inserted to be mounted on the frame 20. This may be understood as meaning that the cable passage hole 22 is formed in the windshield mount 21 in the direction S2 perpendicular to the stacking direction S1.

The cable 30 may be a thin flat cable such as FFC (flexible flat cable) or FPC (flexible printed circuit). A connector-type cable fastening structure is implemented by providing a connector, into which a cable is inserted, on a substrate and by inserting a terminal of the cable into the corresponding connector. However, according to the connector-type cable fastening structure, the connector has a protruding shape that is protruded outside the substrate, and there is a risk that the connector may be damaged by impacts. Accordingly, the cable 30 according to the present exemplary embodiment may be the flexible flat cable and the thin flat end of the cable 30 may be bonded to the connection portion 17 by a heat-fusion bonding method. Therefore, the fastening structure between the cable 30 and the connection portion 17 may not be easily separated even though the external impacts are applied and may be less likely to be broken since the protruding shape is smaller than that of other types of fastenings.

The cable 30 may be bonded to the connection portion 17 by a heat-fusion bonding method after passing through the cable passage hole 22. In addition, the cable 30 and the connection portion 17 may be more firmly fixed to each other by an inner sealant 52. The inner sealant 52 may be formed of a material that does not interfere with the electrical connection between the cable 30 and the connection portion 17.

The windshield 10 mounted on the windshield mount 21 and the frame 20 may be coupled to each other by a sealant 51. The sealant 51 may be any of various types of sealants conventionally used to bond a window of a vehicle to a frame of the vehicle.

The outer transparent plate 11 extends more in the direction S2 perpendicular to the staking direction than the inner transparent plate 12, and a stepped portion is formed in a portion of the windshield 10, which is coupled by the sealant 51. Therefore, when the windshield 10 is coupled to the frame 20 by the sealant 51, the coupling force between the windshield 10 and the frame 20 may be enforced. This is because, since a contact surface of the windshield 10 with the sealant 51 when the windshield 10 includes the stepped portion is more complicated than a contact surface of the windshield 10 with the sealant 51 when the windshield 10 does not include the stepped portion, the windshield 10 is not easily separated from the sealant 51 even though an external force is applied to the windshield 10 in one direction.

Figure 3:
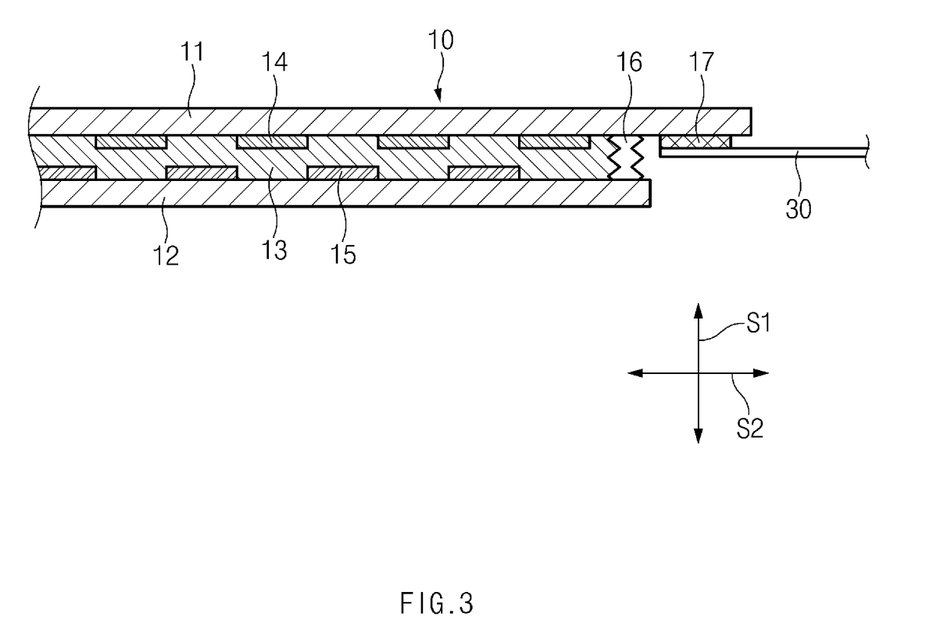
FIG. 3 is a view showing a portion of a windshield of FIG. 2 in detail.

FIG. 3 is a view showing a portion of the windshield of FIG. 2 in detail.

Referring to FIG. 3, the windshield 10 may include the variable transmission layer 13 in which a light transmittance is varied depending on an electric field, and the light transmittance may be varied depending on a voltage source applied to electrodes 14 and 15 of the windshield 10.

The windshield 10 may include the outer transparent plate 11, the inner transparent plate 12, the variable transmission layer 13, a first electrode 14, a second electrode 15, and the connection portion 17.

The outer and inner transparent plates 11 and 12 may be an inorganic material plate or an organic material plate having the light transmittance, or may be a plate in which the inorganic and organic material plates are homogeneously or heterogeneously stacked. For example, the outer and inner transparent plates 11 and 12 may include at least one of glass, quartz, polyethylene terephthalate (PET), polyethylene naphthelate (PEN), polyimide (PI), polycarbonate (PC), polystyrene (PS), polyoxyethlene (POM), acrylonitrile styrene copolymer, or Triacetyl cellulose (TAC).

The first electrode 14 and the second electrode 15 may include at least one of Indium Tin Oxide (ITO) layer, Fluorinated Tin Oxide (FTO) layer, Indium Zinc Oxide (IZO) layer, Al-doped Zinc Oxide (AZO) layer, Zinc Oxide (ZnO) layer, or Indium Zinc Tin Oxide (IZTO) layer and may have the light transmittance.

The variable transmission layer 13 may include a polymer having the transmittance. For example, the variable transmission layer 13 may include a liquid crystal polymer. The liquid crystal polymer has the light transmittance depending on changes in the electric field. Accordingly, when a power is applied to the liquid crystal polymer, the light transmittance of the liquid crystal polymer becomes low, and thus an opaque glass is formed. The liquid crystal polymer has a property in which the light transmittance becomes low as the power applied to the liquid crystal polymer becomes high.

The windshield 10 may further include a sealing portion 16 to seal the variable transmission layer 13. The sealing portion 16 may be formed to surround an edge of the variable transmission layer 13 and may prevent impurities from entering the variable transmission layer 13.

Figure 4:
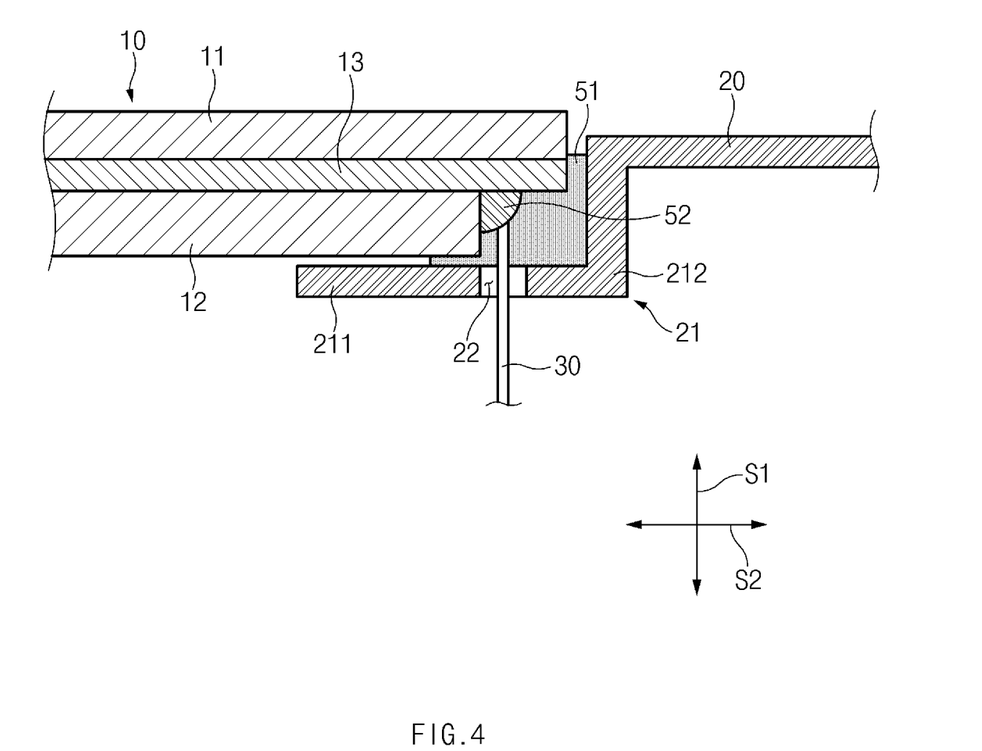
FIG. 4 is a view showing a cross-section corresponding to the line A-A' of FIG. 1 in a frame for a vehicle according to another exemplary embodiment of the present disclosure.

FIG. 4 is a view showing a cross-section corresponding to the line A-A' of FIG. 1 in the frame for the vehicle according to another exemplary embodiment of the present disclosure.

A cable 30 may be connected to a connection portion 17 to be in contact with a relatively large area of the connection portion 17, however, the cable 30 may be connected to the connection portion 17 to be in contact with a relatively small area of the connection portion 17. That is, the cable 30 may be connected to the connection portion 17 in various directions regardless of a connection direction or an area in contact as long as the cable 30 is connected to the connection portion 17.

Referring to FIG. 4, a cable passage hole 22 according to another exemplary embodiment of the present disclosure may be formed in a lower surface portion 211 of a windshield mount. That is, the cable passage hole 22 may be formed in the windshield mount 21 along an insertion direction into which the windshield 10 is inserted to be mounted on a frame 20. This may be understood as meaning that the cable passage hole 22 is formed in the windshield mount 21 in the stacking direction S1.

The cable 30 connected to the connection portion 17 after passing through the cable passage hole 22 may be fixed to the connection portion 17 by an inner sealant 52. The inner sealant 51 may be formed of a material that does not interfere with the electrical connection between the cable 30 and the connection portion 17.

A vehicle including the above-described frame 20 for the vehicle and the windshield 10 may be provided. The vehicle may include a controller 40 (refer to FIG. 1), a power supply device (not shown), and a memory (not shown), which are used to control a power source supplied to a variable transmission layer 13 of the windshield 10.

The power supply device may supply the power source to the windshield 10. The power supply device may be controlled by the controller 40 and may be provided to supply the power source based on lookup table data stored in the memory.

The memory may store the lookup table data and may provide the data when the controller 40 controls the transparency, and thus a response speed related to a transparency adjustment according to a user's selection or other control signals may be minimized. The lookup table is data in which a voltage value provided according to a level of transparency is input, and the lookup table may allow a fast response speed to be provided when the transparency is controlled.

According to the above-described assembling structure between the windshield and the frame, the windshield and other glass plates, which include the variable transparency region, and the frame may be optimally assembled to each other. In particular, a variable transparency glass plate (or a variable transparency panel) is required to be connected to a cable for receiving the electrical signal or the power source. According to the assembling structure of the present disclosure, the cable may pass through a cable passage hole defined through the frame and then may be connected to the variable transparency glass plate.

The frame configured in this manner may be provided to allow the glass plate (or panel), e.g., the variable transparency glass plate, which is required to be connected to the cable, to be appropriately installed without greatly changing a structure of a conventional frame.

Figure 5A:
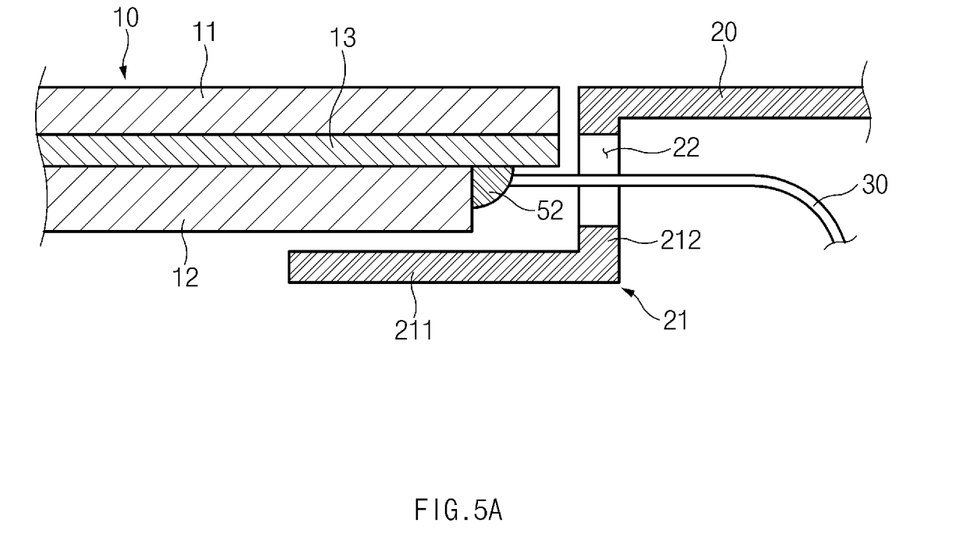
FIGS. 5A, 5B, and 5C are views showing a method for installing a glass plate containing a variable transparency region on a frame of a vehicle according to an exemplary embodiment of the present disclosure.
Figure 5B:
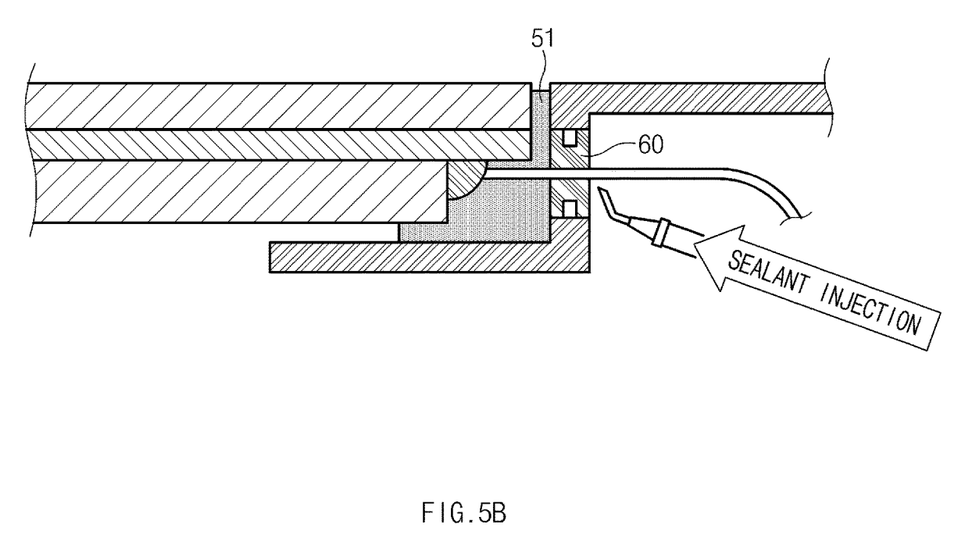
Figure 5C:
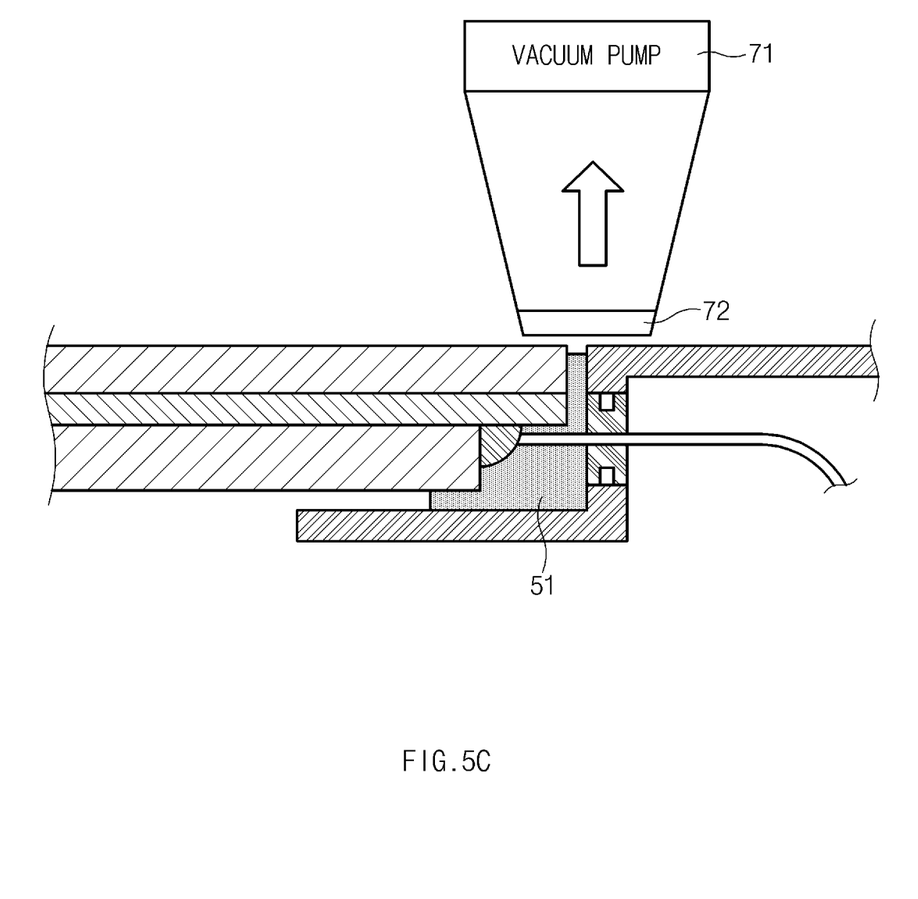

FIGS. 5A, 5B, and 5C are views showing a method for installing the glass plate containing the variable transparency region on the frame of a vehicle according to an exemplary embodiment of the present disclosure.

Referring to FIG. 5A, the windshield 10 is mounted on the windshield mount 21 of the frame 20, and the cable 30 passes through the cable passage hole 22 formed in the windshield mount 21 and is connected to the connection portion 17 of the windshield 10.

The cable 30 may be bonded to the connection portion 17 by the heat-fusion bonding method. After the cable 30 is bonded to the connection portion 17 by the heat-fusion bonding method, the inner sealant 52 is coated on the cable 30 and the connection portion 17. Accordingly, the cable 30 and the connection portion 17 may be more firmly fixed to each other, and simultaneously, the cable 30 and the connection portion 17 may be protected from foreign substances and external impacts. Thus, the electrical connection between the cable 30 and the connection portion 17 may be stably maintained.

Then, referring to FIG. 5B, the sealant 51 may be injected into the space between the windshield 10 and the frame 20 through the cable passage hole 22. The sealant may be injected into a remaining portion where the cable passage hole 22 is not formed in a manner similar to a conventional method of applying the sealant to couple the windshield 10 and the frame 20.

In this case, a protection cap 60 may be installed at the cable passage hole 22 to prevent the sealant 51 from leaking through the cable passage hole 22 after the sealant 51 is injected into the space between the windshield 10 and the frame 20. The protection cap 60 may have a conventional protection cap structure used for sealing an open hole.

Referring to FIG. 5C, a vacuum pump 71 may be used to uniformly distribute the sealant 51 on the coupling surface between the windshield 10 and the frame 20.

The sealant 51 has a high viscosity and may not flow easily. When air between the windshield 10 and the frame 20 is sucked by the vacuum pump 71, the sealant 51 may be forced to flow through the space between the windshield 10 and the frame 20.

In this case, a sealant filter 72 may be installed between the vacuum pump 71 and the windshield 10 or between the vacuum pump 71 and the frame 20 to prevent the sealant 51 from entering the vacuum pump 71.

The sealant filter 72 may be provided with fine holes formed therethrough, which have a diameter smaller than a size of particles of the sealant 51, and thus the sealant 51 may not pass through the sealant filter 72. The sealant filter 72 may be attached to the windshield 10 and the frame 20 to prevent the air from leaking between the sealant filter 72 and the windshield 10 or between the sealant filter 72 and the frame 20. As described above, the sealant 51 may be uniformly distributed by the vacuum pump 71.

When the windshield 10 is installed on the frame 20 using the above-described method, the windshield 10, which is connected to the controller by the cable 30 to control the transparency, may be stably installed on the frame 20, and the cable 30 may be easily and electrically connected to the connection portion 17 of the windshield 10.

In addition, the sealant may be uniformly distributed on the coupling surface by using the vacuum pump 71, and bubbles formed on the coupling surface may be reduced. As a result, the coupling force between the windshield and the frame may be improved.

One or more advantages are achieved in accordance with the embodiments of the present disclosure.

According to the above, the cable passage is disposed on the one side surface of the glass plate mount of the frame to allow the cable connected to the connection portion of the glass plate to pass through the cable passage, and thus the glass plate including the variable transparency region is capable of being installed.

Further, according to the present disclosure, a structure that optimally assembles the glass plate containing the variable transparency region and the frame is provided.

Effects of the present disclosure are not limited to the effects mentioned above, and other effects that are not mentioned may be obviously understood by those skilled in the art from the scope of claims.

While the present disclosure has been described with reference to exemplary embodiments, it will be apparent to those skilled in the art that various changes and modifications may be made without departing from the spirit and scope of the present disclosure.

The invention claimed is:

1. A frame for a vehicle, at which a glass plate comprising a variable transparency region is installed, the frame comprising:
 a glass plate mount configured to allow the glass plate to be inserted and mounted, the glass plate mount having a cable passage to allow a cable connected to a connection portion of the glass plate to pass through the cable passage;
 wherein the glass plate comprises:
  first and second transparent plates stacked on one another in a predetermined stacking direction; and
  a variable transmission layer disposed between the first and second transparent plates and having a transmittance that is variable in response to an electrical signal applied thereto, a connection portion of the variable transmission layer is disposed on a portion of the first transparent plate, which extends more in a direction perpendicular to the stacking direction than the second transparent plate;
 wherein the cable passage is disposed in the glass plate mount at a position corresponding to the connection portion of the variable transmission layer in a state the glass plate is mounted on the frame.

2. The frame of claim 1, wherein the cable passage comprises a cable passage hole formed at the one side surface of the glass plate mount such that a position of the cable passage hole is corresponding to a position of the connection portion to which the cable is connected in a state the glass plate is mounted on the glass plate mount.

3. The frame of claim 2, wherein the cable passage hole is formed in a direction perpendicular to an insertion direction in which the glass plate is inserted to be mounted on the frame.

4. The frame of claim 2, wherein the cable passage hole is formed in an insertion direction in which the glass plate is inserted to be mounted on the frame.

5. A vehicle comprising:
 a laminated glass comprising first and second transparent plates stacked one on another in a predetermined stacking direction and a variable transmission layer disposed between the first and second transparent plates and having a transmittance that is variable in response to an electrical signal applied thereto;
 a frame comprising a glass plate mount that is stepped to allow the laminated glass to be inserted and mounted; and
 a controller configured to adjust a transparency of the variable transmission layer,
 wherein:
  a connection portion is disposed on a portion of the first transparent plate, which extends more in a direction perpendicular to the stacking direction than the second transparent plate, to be connected to the variable transmission layer,
  a cable passage hole is formed in the glass plate mount at a position corresponding to the connection portion, and
  a cable is connected to the connection portion passing through the cable passage hole to electrically connect the controller to the variable transmission layer.

6. The vehicle of claim 5, wherein the cable has a thin flat end connected to the connection portion, and the thin flat end is bonded to the connection portion by a heat-fusion bonding method.

7. A method for installing a glass plate comprising a variable transparency region on a frame for a vehicle, comprising:
 installing the glass plate on a glass plate mount of the frame and allowing a cable to pass through a cable passage formed in the glass plate mount such that the cable is connected to a connection portion of the glass plate;
 injecting a sealant into a space between the glass plate and the frame through the cable passage; and
 distributing the sealant on a coupling surface between the glass plate and the frame uniformly using a vacuum pump.

8. The method of claim 7, wherein the injecting of the sealant further comprises installing a protection cap at the cable passage after the sealant is injected into the space between the glass plate and the frame to prevent the sealant from leaking through the cable passage.

9. The method of claim 7, wherein the distributing of the sealant further comprises operating the vacuum pump after a sealant filter is disposed between the vacuum pump and the glass plate or between the vacuum pump and the frame to prevent the sealant from entering the vacuum pump.

* * * * *